(12) United States Patent
Zhang (10) Patent No.: US 11,745,644 B2
(45) Date of Patent: Sep. 5, 2023

(54) HIGH BEAM AND LOW BEAM SWITCHING DEVICE, VEHICLE LAMP AND VEHICLE

(71) Applicant: HASCO VISION TECHNOLOGY CO., LTD., Shanghai (CN)

(72) Inventor: Jie Zhang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 84 days.

(21) Appl. No.: 17/631,176

(22) PCT Filed: Mar. 30, 2020

(86) PCT No.: PCT/CN2020/081960
§ 371 (c)(1),
(2) Date: Jan. 28, 2022

(87) PCT Pub. No.: WO2021/109375
PCT Pub. Date: Jun. 10, 2021

(65) Prior Publication Data
US 2022/0266745 A1    Aug. 25, 2022

(30) Foreign Application Priority Data
Dec. 4, 2019   (CN) .......................... 201911229916.3

(51) Int. Cl.
*B60Q 1/14* (2006.01)
*F21S 45/42* (2018.01)
*F21S 45/30* (2018.01)

(52) U.S. Cl.
CPC ............ *B60Q 1/1438* (2013.01); *F21S 45/42* (2018.01); *F21S 45/30* (2018.01)

(58) Field of Classification Search
CPC .......... B60Q 1/1438; F21S 45/42; F21S 45/30
See application file for complete search history.

(56) References Cited

U.S. PATENT DOCUMENTS

2014/0022807 A1*  1/2014  Watanabe ............... F21S 41/19
                                                    362/512

FOREIGN PATENT DOCUMENTS

| CN | 105691287 A | 6/2016 |
| CN | 209165278 U | 7/2019 |
| CN | 110936889 A | 3/2020 |
| EP | 2620325 A1 | 7/2013 |
| TW | I651221 B | 2/2019 |

* cited by examiner

*Primary Examiner* — Anne M Hines
(74) *Attorney, Agent, or Firm* — Volpe Koenig (57) ABSTRACT

A high beam and low beam switching device, a vehicle lamp comprising the high beam and low beam switching device, and a vehicle, the device comprising a light shielding plate, an impeller, and a driving device that is used for driving the light shielding plate and the impeller to rotate forwards and backwards; and a limiting mechanism used for limiting the rotation angle of the light shielding plate is provided between the light shielding plate and the driving device. The high-beam and low-beam switching device can achieve the successful switching of a high beam and a low beam, and the use of a vehicle lamp will not be affected; mist or moisture in the interior of the vehicle lamp can be removed, and meanwhile, the heat dissipation effect of the vehicle lamp can be improved, and the space that is occupied by the vehicle lamp will not be increased.

17 Claims, 6 Drawing Sheets

HIGH BEAM AND LOW BEAM SWITCHING DEVICE, VEHICLE LAMP AND VEHICLE

CROSS-REFERENCE TO RELATED APPLICATIONS

The present application is a 35 U.S.C. § 371 national stage of PCT/CN2020/081960, which was filed Mar. 30, 2020, is entitled "HIGH BEAM AND LOW BEAM SWITCHING DEVICE, VEHICLE LAMP, AND VEHICLE" and claims the benefits of Chinese patent application 201911229916.3, filed on Dec. 4, 2019, both of which are incorporated herein by reference as if fully set forth.

FIELD

The present disclosure relates to the technical field of vehicle lamps, in particular to a high beam and low beam switching device. Moreover, the present disclosure further relates to a vehicle lamp with the high beam and low beam switching device, and a vehicle.

BACKGROUND

Vehicles are an indispensable means of transportation in the life or work of modern people, and bring great convenience to modern people's life and work. A vehicle generally needs to be equipped with vehicle lamps, which can facilitate surrounding vehicles and other drivers to observe the vehicle in time and play a warning role, and also allows a driver to observe the road conditions during driving, so as to reduce the occurrence of traffic accidents.

However, in some special cases, water can easily enter the vehicle lamps. At this time, when a light source in the vehicle lamps is turned on, the temperature in the vehicle lamps becomes higher, and the water entering the vehicle lamps will form fog inside the vehicle lamps, so that light emitted by the light source of the vehicle lamps is irregularly refracted inside the vehicle lamps, affecting the light shape and brightness of the entire vehicle lamps, which in turn affects the driver's line of sight and driving safety.

At present, there are two most commonly used methods for removing fog of a vehicle lamp: a first method is to install a heating device inside the vehicle lamp, and a second method is to separately install a fan inside the vehicle lamp. However, the first method will cause the internal temperature of the vehicle lamp to be too high, thereby causing safety hazards, moreover, this method only heats the water inside the vehicle lamp to evaporate to form water vapor, when the internal temperature of the vehicle lamp decreases, the water vapor liquefies to form liquid water, and when the vehicle lamp is turned on again, the fog will still appear, which cannot remove the fog fundamentally; while in the second method, the fan installed also includes a motor, so that the fan is generally larger in size, which increases the space occupied by the vehicle lamp and the installation cost.

High beam and low beam switching devices have been widely used in the field of vehicle lamps, but most of the current research directions are to reduce the power consumption, reduce the generated heat, improve the switching effect, reduce the vibration in the switching process and the like. It is not conceivable that the defogging effect can be achieved by the high beam and low beam switching devices.

In view of this, there is a need for providing a high beam and low beam switching device capable of defogging.

SUMMARY

To solve the technical problems in a first aspect, the present disclosure provides a high beam and low beam switching device, which can smoothly switch high and low beams without affecting the use of a vehicle lamp, remove fog or moisture in the vehicle lamp, improve the heat dissipation effect of the vehicle lamp, and not increase the occupied space of the vehicle lamp.

To solve the technical problems in a second aspect, the present disclosure provides a vehicle lamp, and the high beam and low beam switching device of the vehicle lamp can smoothly remove fog or moisture in the vehicle lamp, improve the heat dissipation effect of the vehicle lamp, and not increase the occupied space of the vehicle lamp.

To solve the technical problems in a third aspect, the present disclosure provides a vehicle, and the vehicle lamp of the vehicle can smoothly switch high and low beams, realize no fog inside the vehicle lamp, and ensure safe driving of the vehicle.

To solve the technical problems described above, the first aspect of the present disclosure provides the high beam and low beam switching device, comprising a light shielding plate, an impeller and a driving device that is used for driving the light shielding plate and the impeller to rotate forwards and backwards; and a limiting mechanism used for limiting the rotation angle of the light shielding plate is provided between the light shielding plate and the driving device.

Preferably, the driving device includes a motor and a friction wheel providing on a drive shaft of the motor. The friction wheel is in contact with the light shielding plate.

Further preferably, the light shielding plate includes a light shielding plate body provided with a first connecting rod. The friction wheel is in contact with the first connecting rod.

Preferably, the driving device includes a motor and a fluid coupling. A pump wheel of the fluid coupling is connected to the drive shaft of the motor. A turbine of the fluid coupling is connected to the light shielding plate.

Further preferably, the light shielding plate includes the light shielding plate body, a second connecting rod is disposed on the light shielding plate body. The limiting mechanism includes a limiting block disposed on the driving device. A limiting groove is formed in the limiting block. The second connecting rod is rotationally connected with the driving device. The second connecting rod is provided with a protrusion. The protrusion is disposed in the limiting groove so as to limit the rotation angle of the light shielding plate.

Further preferably, the light shielding plate includes the shielding plate body, a second connecting rod is disposed on the light shielding plate body. The limiting mechanism includes two limiting blocks disposed on the driving device. A limiting groove is formed between the two limiting blocks. The second connecting rod is rotationally connected with the driving device. The second connecting rod is provided with a protrusion. The protrusion is disposed in the limiting groove so as to limit the rotation angle of the light shielding plate.

Further preferably, a spring assembly configured to reset the light shielding plate is disposed on the driving device.

Further preferably, the spring assembly includes a scroll spring and a spring support. The scroll spring is fixed to the driving device by the spring support, a free end of the scroll spring is connected to the light shielding plate.

In the second aspect, the present disclosure provides the vehicle lamp. The vehicle lamp includes the high beam and low beam switching device according to any one of the above-mentioned technical solutions of the first aspect.

In the third aspect, the present disclosure provides the vehicle. The vehicle includes the vehicle lamp according to any one of the above-described technical solutions of the second aspect.

Through the technical solutions, the high beam and low beam switching device of the present disclosure controls the rotation of the impeller through the driving device to form air convection, so that the high beam and low beam switching device plays a role of a fan, is configured to remove fog in the vehicle lamp, and can improve the heat dissipation effect in the vehicle lamp through the air convection. According to the high beam and low beam switching device, the high and low beams can be switched by forwards and backwards rotating the light shielding plate through the driving device, and the rotation angle of the light shielding plate can be limited through the limiting mechanism, so that not only can the switching of the high and low beams be realized, but also the situation that the rotation angle is too large and the resetting of the light shielding plate is not facilitated can be prevented. The high beam and low beam switching device of the present disclosure can effectively remove fog in the vehicle lamp, can improve the heat dissipation effect of the vehicle lamp, and does not increase the size of the whole vehicle lamp.

Other advantages of the present disclosure, as well as the technical effects of the preferable implementations, will be further detailed in the specific implementations hereunder.

| Brief Description of the Symbols: | |
|---|---|
| 1. light shielding plate | 2. impeller |
| 3. driving device | 4. limiting mechanism |
| 5. spring assembly | |
| 11. light shielding plate body | 12. first connecting rod |
| 13. second connecting rod | 14. cut-off line structure |
| 31. drive shaft | 32. friction wheel |
| 41. limiting block | |
| 51. scroll spring | 52. spring support |
| 131. protrusion | |
| 411. limiting groove | |

DETAILED DESCRIPTION OF THE EMBODIMENTS

Hereunder the specific implementations of the present disclosure will be detailed, with reference to the accompanying drawings. It should be appreciated that the specific implementations described here are only provided to describe and explain the present disclosure, but shall not be deemed as constituting any limitation to the present disclosure.

In descriptions of the present disclosure, it is to be explanatory that the terms 'connection' and 'connected' are to be interpreted broadly, e.g., fixed or detachable connection, or integral connection, unless expressly specified and limited otherwise; it can be direct connection, or indirect connection through an intermediary, or it can be internal communication between two elements, or an interaction between two elements. The specific meanings of the above terms in the present disclosure will be understood by those of ordinary skill in the art, as the case may be.

In the specific implementations of the present disclosure, as shown in FIGS. 1-5, the present disclosure provides a high beam and low beam switching device, which includes a light shielding plate 1, an impeller 2 and a driving device 3 that is used for driving the light shielding plate 1 and the impeller 2 to rotate forwards and backwards, wherein a limiting mechanism 4 configured to limit the maximum rotation angle of the light shielding plate 1 is disposed between the light shielding plate 1 and the driving device 3.

Specifically, the impeller 2 is connected to a drive shaft 31 of the driving device 3, and when the driving device 3 operates, the drive shaft 31 drives the impeller 3 to rotate, thereby forming air convection to disperse fog in a vehicle lamp.

Of course, forward and backward rotations are relative and not specifically limited, and can be set as follows: when facing the impeller 2, the clockwise rotation of the impeller 2 is called forward rotation and the counter-clockwise rotation of the impeller 2 is called backward rotation. However, specifically, whether the forward rotation forms a high beam shape or a low beam shape requires consideration of the upper and lower positions of the installation of a high beam light and a low beam light, the setting of an initial position of the light shielding plate 1, and the like, which may be specifically considered by an installer according to actual installation situations. In the following, the case that forward rotation forms a high beam and backward rotation forms a low beam is taken as an example.

When the high beam and low beam switching device provided by the above basic implementation works, the vehicle lamp can form the low beam shape when the light shielding plate 1 is in an initial position, a cut-off line of the low beam shape is formed at the position of the light shielding plate 1, if the vehicle lamp needs to be switched into the high beam shape at the moment, the light shielding plate 1 only needs to be driven to rotate forwards through the driving device 3, and the limiting mechanism can limit the maximum rotation angle of the light shielding plate 1 so that the light shielding plate 1 can be at a proper position for forming the high beam shape; and at the moment, the driving device 3 can also simultaneously drive the impeller 2 to rotate forwards to form air convection so as to disperse fog in the vehicle lamp. When the vehicle lamp needs to be switched into the low beam shape again, the light shielding plate 1 is backwards rotated through the driving device 3, and the limiting mechanism can ensure that the light shielding plate 1 returns to the initial position, so that the low beam shape is formed, the cut-off line of the low beam shape is formed at the position of the light shielding plate 1, and at the moment, the driving device 3 can also simultaneously drive the impeller 2 to backwards rotate to form air convection so as to disperse fog in the vehicle lamp.

According to the high beam and low beam switching device provided by the above basic implementation, not only can element light switching be formed, but also air convection can be formed through forward rotation or backward rotation of the impeller 2 so as to disperse fog in the vehicle lamp, the interior of the vehicle lamp can be cooled, and the size of the whole vehicle lamp cannot be increased.

Figure 7:
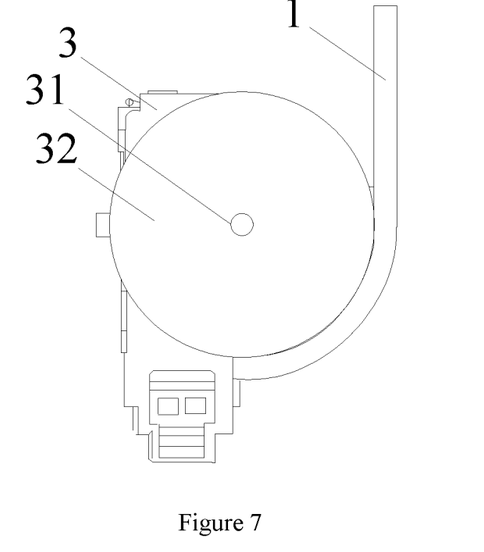
FIG. 7 is a partial schematic diagram showing the high beam and low beam switching device according to another embodiment of the present disclosure.

There are many ways to drive the light shielding plate 1 to rotate forwards and backwards through the driving device 3. Specifically, as shown in FIG. 7, the driving device 3 includes a motor and a friction wheel 32 providing on a drive shaft 31 of the motor; and the friction wheel 32 is in contact with the light shielding plate 1. The drive shaft 31 of the motor drives the friction wheel 32 to rotate, and then the light shielding plate 1 is driven to rotate through a sliding friction force between the rotating friction wheel 32 and the light shielding plate 1; of course, at the moment, the sliding friction between the light shielding plate 1 and the friction wheel 32 can just drive the light shielding plate 1 to rotate, which can reduce the internal energy loss caused by the friction between the friction wheel 32 and the light shielding plate 1 after the light shielding plate 1 reaches a fixed position.

Figure 11:
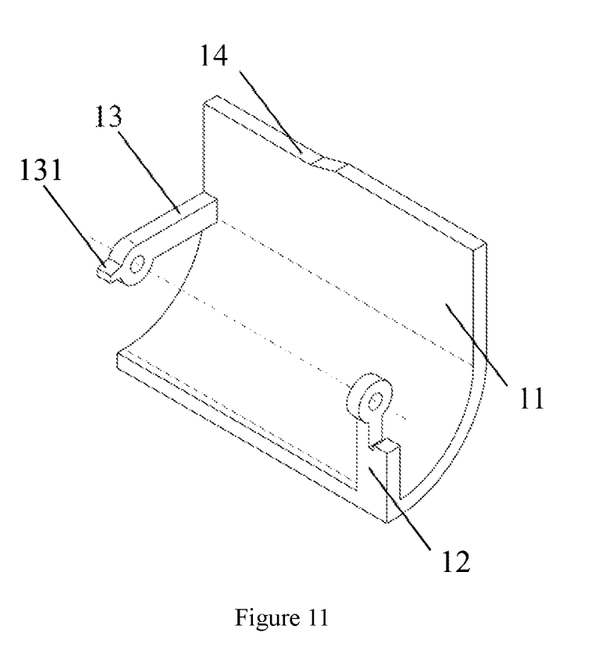
FIG. 11 is a structural schematic diagram showing a light shielding plate according to one embodiment of the present disclosure.

More specifically, as shown in FIG. 11, the light shielding plate 1 includes a light shielding plate body 11, a first connecting rod 12 is disposed on the light shielding plate body 11, and the friction wheel is in contact with the first connecting rod 12.

Further specifically, the light shielding plate body 11 includes an arc plate portion and a straight plate portion, a radian of the arc plate portion is set not to affect the rotation of the arc plate portion around the motor, one end of the straight plate portion is connected to the arc plate portion, and the other end of the straight plate portion is formed as a cut-off line structure 14. Specifically, the driving device 4 includes a motor and a fluid coupling, a pump wheel of the fluid coupling is connected to the drive shaft 31 of the motor, and a turbine of the fluid coupling is connected to the light shielding plate 1. The driving device 3 transmits torque through a change of moment of momentum generated by the interaction of liquid between the pump wheel and the turbine and blades on the turbine and the pump wheel, so as to drive the light shielding plate 1 to rotate.

Figure 1:
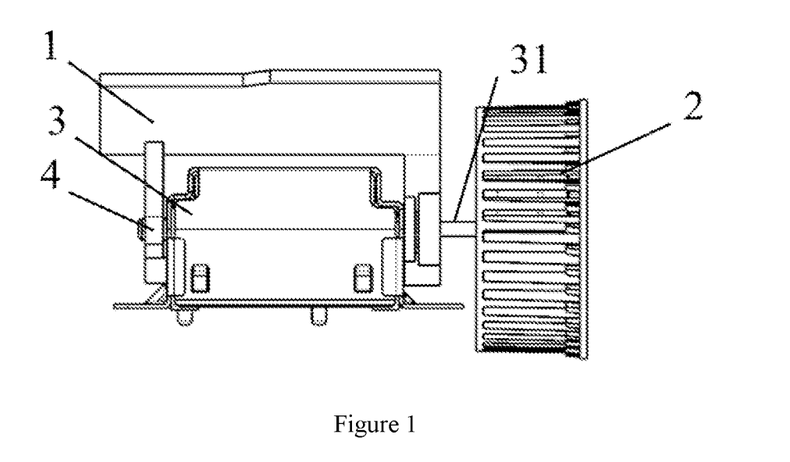
FIG. 1 is a structural schematic diagram showing a view angle of a high beam and low beam switching device according to one embodiment of the present disclosure.
Figure 2:
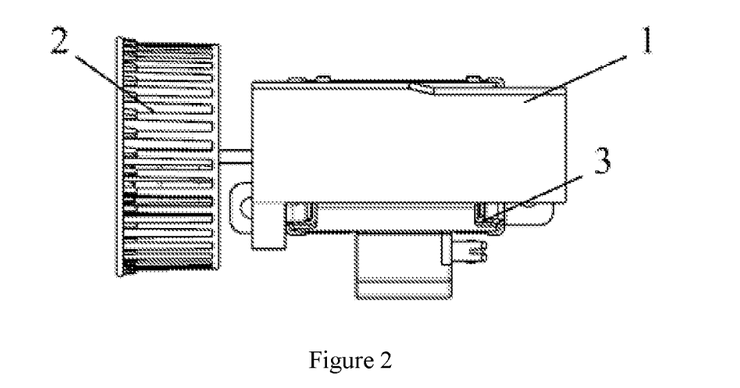
FIG. 2 is a structural schematic diagram showing another view angle of the high beam and low beam switching device according to one embodiment of the present disclosure.
Figure 3:
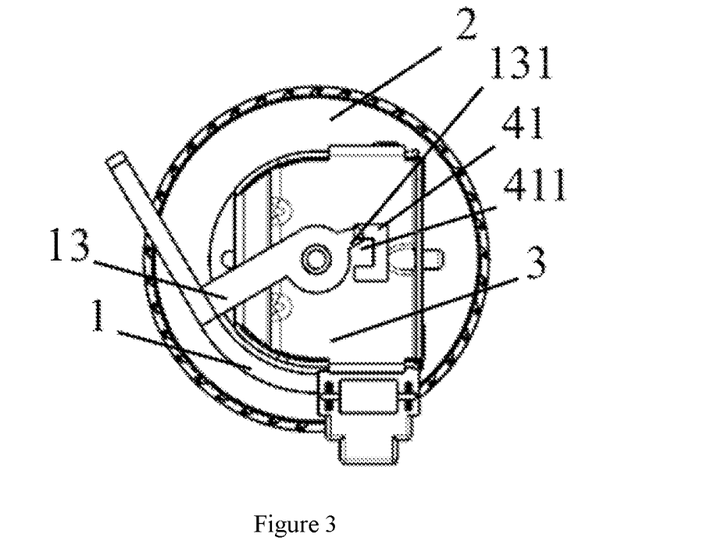
FIG. 3 is a side view showing a view angle of the high beam and low beam switching device according to one embodiment of the present disclosure.
Figure 4:
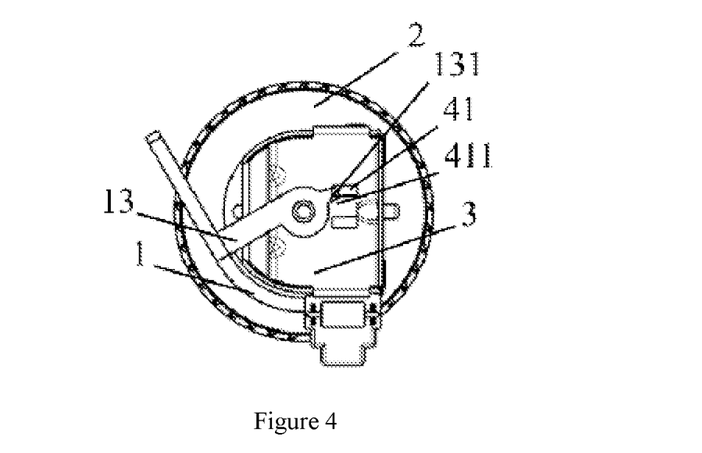
FIG. 4 is a side view showing a view angle of the high beam and low beam switching device according to another embodiment of the present disclosure.
Figure 5:
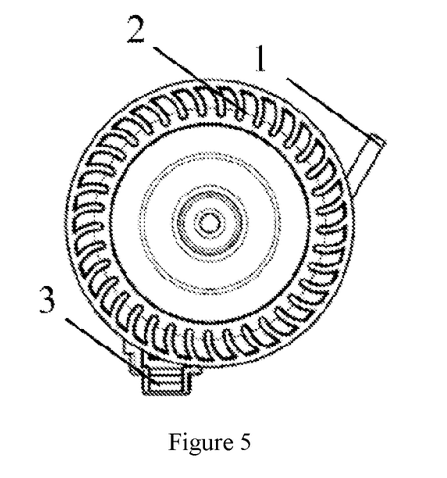
FIG. 5 is a side view showing another view angle of the high beam and low beam switching device according to one embodiment of the present disclosure.
Figure 6:
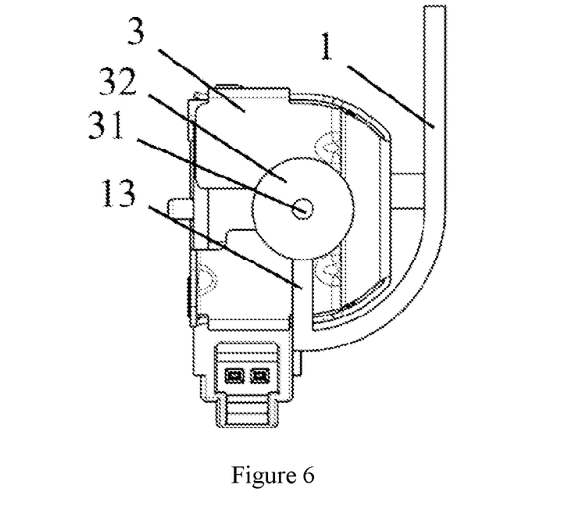
FIG. 6 is a partial schematic diagram showing the high beam and low beam switching device according to one embodiment of the present disclosure.
Figure 9:
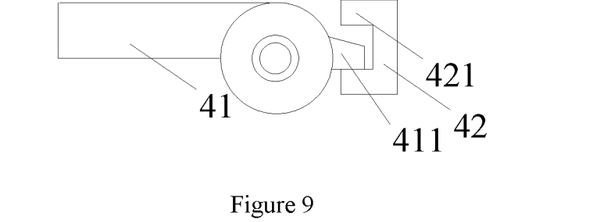
FIG. 9 is a structural schematic diagram showing a limiting mechanism according to one embodiment of the present disclosure.
Figure 10:
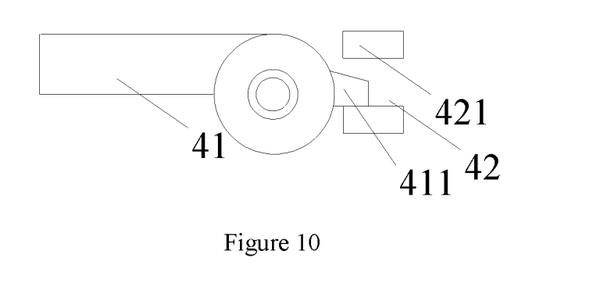
FIG. 10 is a structural schematic diagram showing the limiting mechanism according to another embodiment of the present disclosure.

The limiting mechanism may have many structures for achieving a limiting function. According to one embodiment of the present disclosure, as shown in FIGS. 3, 9 and 11, the light shielding plate 1 includes the light shielding plate body 11, and a second connecting rod 13 is disposed on the light shielding plate body 11; the limiting mechanism 4 includes a limiting block 41 disposed on the driving device 3, and a limiting groove 411 is formed in the limiting block 41; the second connecting rod 13 is rotationally connected with the driving device 3; and the second connecting rod 13 is provided with a protrusion 131, and the protrusion 131 is disposed in the limiting groove 411 so as to limit the maximum rotation angle of the light shielding plate 1. According to another embodiment of the present disclosure, as shown in FIGS. 4, 10 and 11, the light shielding plate 1 includes the light shielding plate body 11, and a second connecting rod 13 is disposed on the light shielding plate body 11; the limiting mechanism 4 includes two limiting blocks 41 disposed on the driving device 3, and a limiting groove 411 is formed between the two limiting blocks 41; the second connecting rod 13 is rotationally connected with the driving device 3; and the second connecting rod 13 is provided with a protrusion 131, and the protrusion 131 is disposed in the limiting groove 411 so as to limit the maximum rotation angle of the light shielding plate 1.

In order to further limit the movement of a shielding plate, or ensure that the shielding plate 1 which is not reset returns to the original position under the condition that the driving device 3 is not electrified, the driving device 3 is further provided with a spring assembly 5 configured to reset the light shielding plate 1.

Figure 8:
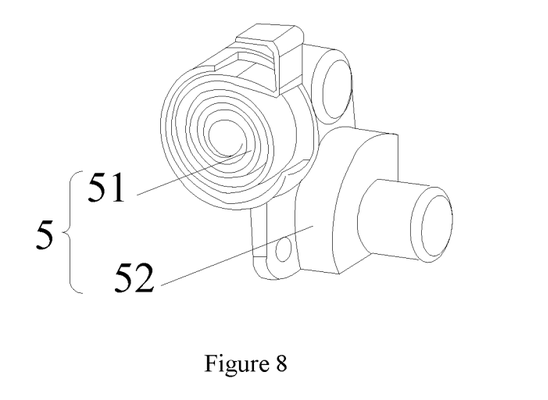
FIG. 8 is a structural schematic diagram showing a spring assembly according to one embodiment of the present disclosure.

Specifically, as shown in FIG. 8, the spring assembly 5 includes a scroll spring 51 and a spring support 52, the scroll spring 51 is fixed to the driving device 3 through the spring support 52, and a free end of the scroll spring 51 is connected to the light shielding plate 1. When the light shielding plate 1 rotates from the original position to other positions, the scroll spring 51 connected to the light shielding plate 1 is in a stretched state, at the moment, if a power supply of the driving device 3 is cut off, the scroll spring 51 automatically returns to the original position under the action of elastic force, and meanwhile drives the light shielding plate to return to the original position.

In a relatively preferable implementation of the present disclosure, as shown in FIGS. 1-3, 8, 9 and 11, the high beam and low beam switching device includes the light shielding plate 1, the impeller 2 and the driving device 3, the driving device 3 includes the motor and the fluid coupling, the pump wheel of the fluid coupling is connected to the drive shaft 31 of the motor, and the turbine of the fluid coupling is connected with the light shielding plate 1; the limiting mechanism 4 configured to control the maximum rotation angle of the light shielding plate 1 is disposed between the light shielding plate 1 and the driving device 3; the light shielding plate 1 includes the light shielding plate body 11, and the second connecting rod 13 is disposed on the light shielding plate body 11; the limiting mechanism 4 includes the limiting block 41 disposed on the driving device 3, and the limiting groove 411 is formed in the limiting block 41; the second connecting rod 13 is rotationally connected with the driving device 3; the second connecting rod 13 is provided with the protrusion 131, and the protrusion 131 is disposed in the limiting groove 411 so as to limit the maximum rotation angle of the light shielding plate 1; the driving device 3 is also provided with the spring assembly 5 configured to reset the light shielding plate 1; and the spring assembly 5 includes the scroll spring 51 and the spring support 52, the scroll spring 51 is fixed to the driving device 3 through the spring support 52, and the free end of the scroll spring 51 is connected to the light shielding plate 1.

According to a high beam and low beam switching device provided by some embodiments of the present disclosure, the motor controls the fluid coupling to drive the impeller 2 to rotate to form air convection, so that the high beam and low beam switching device plays a role of a fan, is configured to remove fog in the vehicle lamp, and simultaneously can increase the heat dissipation effect in the vehicle lamp. According to the present disclosure, the switching of the high and low beams can be realized by rotating the light shielding plate 1, and the rotation maximum angle of the light shielding plate 1 can be limited by the limiting mechanism 4, so that the switching of the high and low beams is realized, and the situation that the rotation angle is too large and the resetting of the light shielding plate 1 is not facilitated can be prevented. Under the condition of no electrification, the light shielding plate 1 can be promoted to reset through the elastic force of the scroll spring 51 in the spring assembly 5, and the switching of the high beam and low beam switching device in the next use process is facilitated. According to the present disclosure, the fog in the vehicle lamp can be effectively removed, meanwhile, the heat dissipation effect of the vehicle lamp can be improved, and the size of the whole vehicle lamp cannot be increased. In addition, the embodiment of the present disclosure provides a vehicle lamp, which includes the high beam and low beam switching device provided by any one of the above embodiments. The embodiment of the present disclosure also provides a vehicle, which includes the vehicle lamp described in the above embodiment.

While preferable implementations of the present disclosure are described above with reference to the accompanying drawings, the present disclosure is not limited thereto. Within the scope of the technical idea of the present disclosure, numerous simple variations can be made to the technical solution of the present disclosure, including combinations of the individual specific technical features in any suitable way. In order to avoid unnecessary repetition, the present disclosure will not be further described with respect to various possible combinations. However, such simple variations and combinations should also be considered as the content disclosed by the present disclosure, and all fall into the protection scope of the present disclosure.

The invention claimed is:

1. A high beam and low beam switching device, comprising a light shielding plate, an impeller and a driving device that is used for driving the light shielding plate and the impeller to rotate forwards and backwards, wherein a limiting mechanism used for limiting the rotation angle of the light shielding plate is provided between the light shielding plate and the driving device.

2. The high beam and low beam switching device according to claim 1, wherein the driving device comprises a motor and a friction wheel providing on a drive shaft of the motor, and the friction wheel is in contact with the light shielding plate.

3. The high beam and low beam switching device according to claim 2, wherein the light shielding plate comprises a light shielding plate body provided with a first connecting rod, and the friction wheel is in contact with the first connecting rod.

4. The high beam and low beam switching device according to claim 1, wherein the driving device comprises a motor and a fluid coupling, a pump wheel of the fluid coupling is connected to the drive shaft of the motor, and a turbine of the fluid coupling is connected to the light shielding plate.

5. The high beam and low beam switching device according to claim 1, wherein the light shielding plate comprises the light shielding plate body, and a second connecting rod is disposed on the light shielding plate body; the limiting mechanism comprises a limiting block disposed on the driving device, and a limiting groove is formed in the limiting block;

the second connecting rod is rotationally connected with the driving device; and the second connecting rod is provided with a protrusion, and the protrusion is disposed in the limiting groove so as to limit the rotation angle of the light shielding plate.

6. The high beam and low beam switching device according to claim 1, wherein the light shielding plate comprises the light shielding plate body, and a second connecting rod is disposed on the light shielding plate body; the limiting mechanism comprises two limiting blocks disposed on the driving device, and a limiting groove is formed between the two limiting blocks;

the second connecting rod is rotationally connected with the driving device; and the second connecting rod is provided with a protrusion, and the protrusion is disposed in the limiting groove so as to limit the rotation angle of the light shielding plate.

7. The high beam and low beam switching device according to claim 1, wherein the driving device is further provided with a spring assembly configured to reset the light shielding plate.

8. The high beam and low beam switching device according to claim 7, wherein the spring assembly comprises a scroll spring and a spring support, the scroll spring is fixed to the driving device by the spring support, and a free end of the scroll spring is connected to the light shielding plate.

9. A vehicle lamp, comprising the high beam and low beam switching device according to claim 1.

10. A vehicle, comprising the vehicle lamp according to claim 9.

11. The vehicle lamp according to claim 9, wherein the driving device comprises a motor and a friction wheel providing on a drive shaft of the motor, and the friction wheel is in contact with the light shielding plate.

12. The vehicle lamp according to claim 11, wherein the light shielding plate comprises a light shielding plate body provided with a first connecting rod, and the friction wheel is in contact with the first connecting rod.

13. The vehicle lamp according to claim 9, wherein the driving device comprises a motor and a fluid coupling, a pump wheel of the fluid coupling is connected to the drive shaft of the motor, and a turbine of the fluid coupling is connected to the light shielding plate.

14. The vehicle lamp according to claim 9, wherein the light shielding plate comprises the light shielding plate body, and a second connecting rod is disposed on the light shielding plate body; the limiting mechanism comprises a limiting block disposed on the driving device, and a limiting groove is formed in the limiting block;

the second connecting rod is rotationally connected with the driving device; and the second connecting rod is provided with a protrusion, and the protrusion is disposed in the limiting groove so as to limit the rotation angle of the light shielding plate.

15. The vehicle lamp according to claim 9, wherein the light shielding plate comprises the light shielding plate body, and a second connecting rod is disposed on the light shielding plate body; the limiting mechanism comprises two limiting blocks disposed on the driving device, and a limiting groove is formed between the two limiting blocks;

the second connecting rod is rotationally connected with the driving device; and the second connecting rod is provided with a protrusion, and the protrusion is disposed in the limiting groove so as to limit the rotation angle of the light shielding plate.

16. The vehicle lamp according to claim 9, wherein the driving device is further provided with a spring assembly configured to reset the light shielding plate.

17. The vehicle lamp according to claim 16, wherein the spring assembly comprises a scroll spring and a spring support, the scroll spring is fixed to the driving device by the spring support, and a free end of the scroll spring is connected to the light shielding plate.

* * * * *